United States Patent [19]

Fisher

[11] Patent Number: 5,614,052
[45] Date of Patent: Mar. 25, 1997

[54] VACUUM RETENTION GASKET SPLICING

[75] Inventor: Michael J. Fisher, Newburgh, Ind.

[73] Assignee: GenCorp Inc., Fairlawn, Ohio

[21] Appl. No.: 360,921

[22] Filed: Dec. 21, 1994

[51] Int. Cl.$^6$ .................................................. B32B 31/00
[52] U.S. Cl. .................... 156/304.2; 156/158; 156/285; 156/304.6; 156/502
[58] Field of Search .................................. 156/157, 158, 156/285, 304.1, 304.2, 304.6, 502, 507

[56] References Cited

U.S. PATENT DOCUMENTS

| | | | |
|---|---|---|---|
| 2,908,949 | 10/1959 | Frehse | 20/69 |
| 3,178,778 | 4/1965 | Reahard | 20/69 |
| 3,186,891 | 6/1965 | Gelling et al. | 156/502 |
| 3,952,455 | 4/1976 | McAlarney | 49/497 |
| 4,101,357 | 7/1978 | Rothrock | 156/157 |
| 4,138,049 | 2/1979 | McAlarney | 277/80 |
| 4,162,183 | 7/1979 | Estes | 156/505 |
| 4,255,475 | 3/1981 | Delgrande | 428/44 |
| 4,328,066 | 5/1982 | Kiuchi et al. | 156/157 X |
| 4,390,578 | 6/1983 | Brooks | 428/57 |
| 4,532,166 | 7/1985 | Thompson et al. | 428/57 |
| 4,700,509 | 10/1987 | Merla | 49/487 |
| 4,707,201 | 11/1987 | Failes | 156/158 X |
| 4,801,349 | 1/1989 | Dommer | 156/503 |
| 4,832,773 | 5/1989 | Shaposka et al. | 156/158 |
| 4,929,409 | 5/1990 | L. Agren | 264/508 |
| 5,037,500 | 8/1991 | Hilpert | 156/503 |
| 5,057,347 | 10/1991 | Alvin | 156/304.3 X |
| 5,096,652 | 3/1992 | Uchiyama et al. | 264/511 |
| 5,156,701 | 10/1992 | Spencer et al. | 156/158 |
| 5,181,330 | 1/1993 | Schoch | 34/162 |
| 5,188,787 | 2/1993 | King et al. | 264/153 |
| 5,244,522 | 9/1993 | Spencer et al. | 156/158 |
| 5,257,791 | 11/1993 | Cittadini et al. | 277/80 |
| 5,421,944 | 6/1995 | Davis et al. | 156/304.2 |

FOREIGN PATENT DOCUMENTS

| | | | |
|---|---|---|---|
| 6-15746 | 1/1994 | Japan | 156/157 |

Primary Examiner—David A. Simmons
Assistant Examiner—Paul M. Rivard
Attorney, Agent, or Firm—Robert F. Rywalski; David A. Spenard

[57] ABSTRACT

The present invention relates to a method of splicing a hollow gasket such that the final welded joint remains highly flexible and does not impair the fluid flow between the two spliced sections. The two gasket sections having identical multiple-chambered cross-sections are held in a splice mold by precision tooling and air drawn through small holes in the splice mold by a vacuum pump. Heat is applied to each end of the gasket sections and the ends are brought into contact with one another. As the ends cool, a welded joint is formed. The integrity of each individual chamber is maintained so that, when spliced, the two gaskets sections become one, with the chambers forming continuous channels. The continuous channels create a higher insulating quality than if the channels were blocked at the welded joints. Further, corners spliced in this manner remain as flexible as the adjoining gasket sections. Magnetic strips may be inserted into selected channels to assist in maintaining the proper position of the gasket when in use as well as provide a magnetic latch. A common application for such a gasket is for use with a refrigerator door.

17 Claims, 2 Drawing Sheets

VACUUM RETENTION GASKET SPLICING

FIELD OF THE INVENTION

The present invention relates to a method of splicing a gasket using vacuum retention and heat bonding. More specifically, the present invention relates to splicing a hollow, thin-wall, multiple-channel gasket, such that the final welded joint provides a highly flexible corner and does not affect the fluid communication between the channels of the two spliced gasket sections.

BACKGROUND OF THE INVENTION

Hollow gaskets having multiple-channels make excellent sealing strips for refrigerator doors and the like because the multiple channels form insulating dead air spaces throughout the entire inner portion of the gasket and give a certain resilience to the gasket. This compressible yet resilient construction permits a large surface width of the gasket to conform against the frame surface to provide an excellent thermal seal for the door. Such gaskets are well known in the art, for example, U. S. Pat. Nos. 3,178,778 and 2,908,949.

Several improvements to the basic design have surfaced in the development of gasket art. One improvement, for example, involves the creation of one or more central cells, also know as bulbs or balloons, such as those described in U. S. Pat. Nos. 3,952,455 and 4,138,049. The central cells increase the insulating dead air space to enhance the overall insulating quality of the gasket as well as cooperate with the outer walls of the gasket to provide increased flexibility.

Magnetic strips having a flat surface can be used in conjunction with the above-mentioned compressible gaskets to enhance the sealing function. The magnetic strips are usually positioned inside one of the channels of the gasket which is affixed to the door of the refrigerator. The gasket wall is sufficiently thin to allow the strips to magnetically adhere to the refrigerator frame through the gasket walls, thus acting as a magnetic latch.

Since the gaskets usually cannot be employed as one continuous length of material, several sections must be spliced together to form the entire gasket according to the shape of the opening to be sealed (usually rectangular for refrigerator applications). Standard splicing techniques such as heat welding have two major problems associated therewith.

First, the gaskets are usually made of an extruded material such as a PVC compound or the like, and are made with inner and outer walls which are quite thin for enhanced flexibility. As wall thickness decreases, the heat splicing process tends to fuse the thin inner walls to the side walls and to each other, forming what is known in the industry as "hard corners." Hard corners destroy the continuity of the channels of the gasket at the spliced joint and ultimately degrade the insulating quality of the gasket. Further, hard corners are less flexible than the adjoining gasket sections, inhibiting compression around the corner area which also degrades the insulating efficiency of the gasket.

Second, as the area of the central cell increases to provide more flexibility, the overall stiffness of the gasket section decreases, making it difficult to manipulate within the splice mold area. Extremely flexible gaskets have a tendency to escape the tooling of the splice mold, causing frequent and expensive delays for a human operator to correct before the splicing process can be successfully completed.

SUMMARY OF THE INVENTION

The present invention provides a solution to the above-mentioned problems of channel blockage, less compressible corner areas and overly flexible gaskets by creating "soft corners" in lieu of the hard corners described above. The present application teaches a method of thermally splicing sections of a hollow, thin-wall, multiple-channel gasket which allows the channels of each spliced gasket section to remain in fluid communication with each other, creates corner areas as flexible as the adjoining gasket sections, and provides a stable environment in which splicing can be accomplished without frequent delays caused by the gasket escaping the splice mold tooling.

The gasket sections used in the preferred embodiment of the present invention have mitered ends which allow several sections to be fitted together to form the desired shape. After the insertion of magnetic strips, two mitered gasket sections are fed into a two-piece splice mold and retained in place at a 90° angle to each other by the tooling of the splice mold. The capability of the tooling to retain the gasket (created by the precision shape of the tooling) is augmented by a vacuum drawn through strategically placed apertures in the splice mold halves. The vacuum-assisted retention of the gasket sections provides the necessary additional stability for a successful splice. The joint is then heat-welded such that the multiple-channels of each gasket section remain in fluid communication with each other and the corners remain flexible. Thus, the highly desirable soft corners are created, which increase the overall thermal efficiency of the finished gasket and ensure the flexibility of the spliced corner.

Accordingly, it is an object of the present invention to provide a method of thermally splicing flexible gasket sections such that, after being joined, the channels of each gasket section are in fluid communication with each other.

It is further an object of the present invention to provide a method of thermally splicing gasket sections wherein the spliced corner areas remain as flexible as the adjoining gasket sections.

It is yet further an object of the present invention to provide a method of thermally splicing highly flexible gasket sections in an environment sufficiently stable to avoid the problem of the sections disengaging from the splice mold during the splicing operation.

For a further understanding of the present invention and the objects thereof, attention is directed to the drawings and the following brief description thereof, to the detailed description of the preferred embodiment, and to the appended claims.

DETAILED DESCRIPTION OF THE PREFERRED EMBODIMENT

Figure 1:
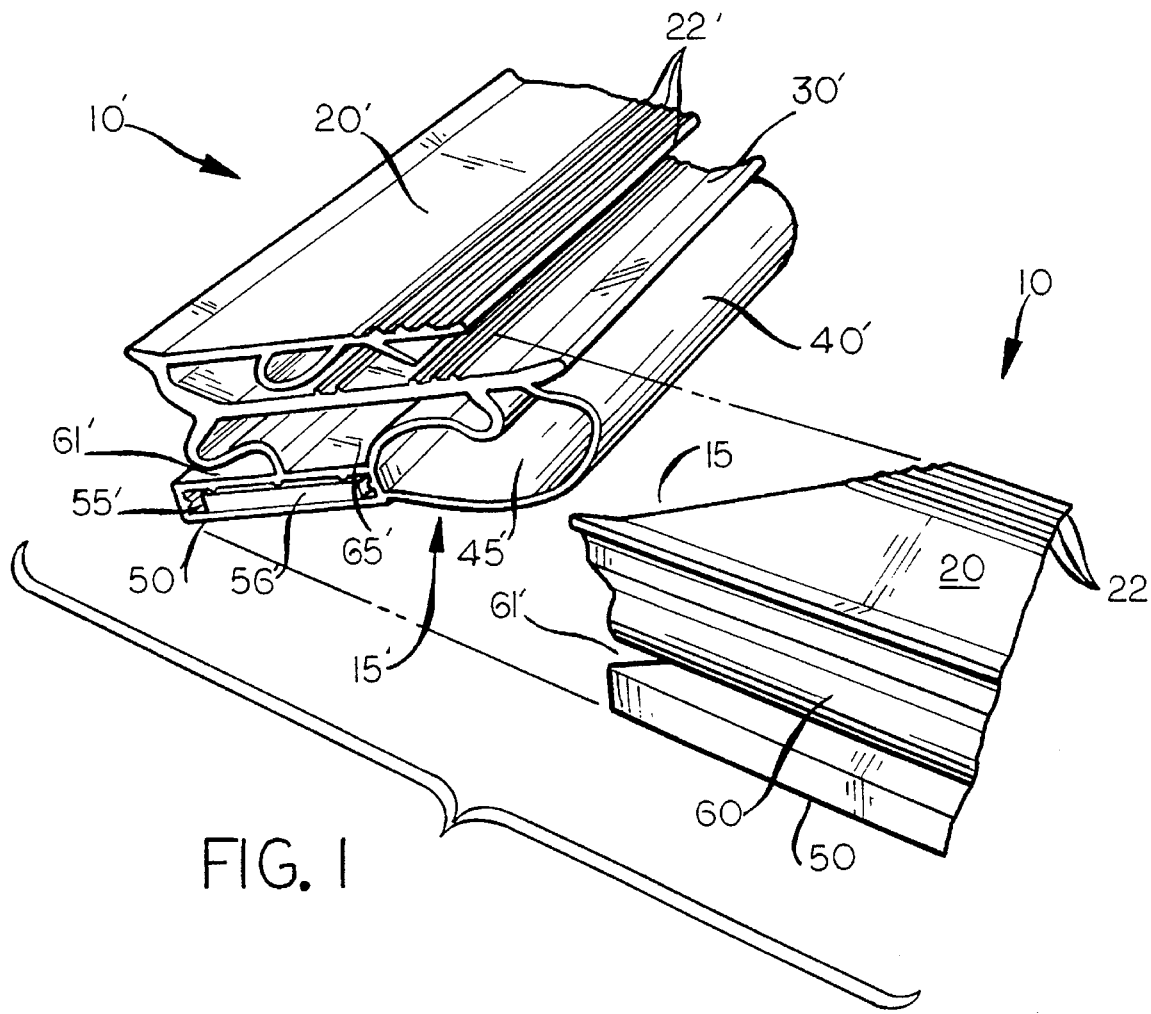
FIG. 1 is a perspective view of two as yet unspliced mitered gasket sections.
Figure 2:
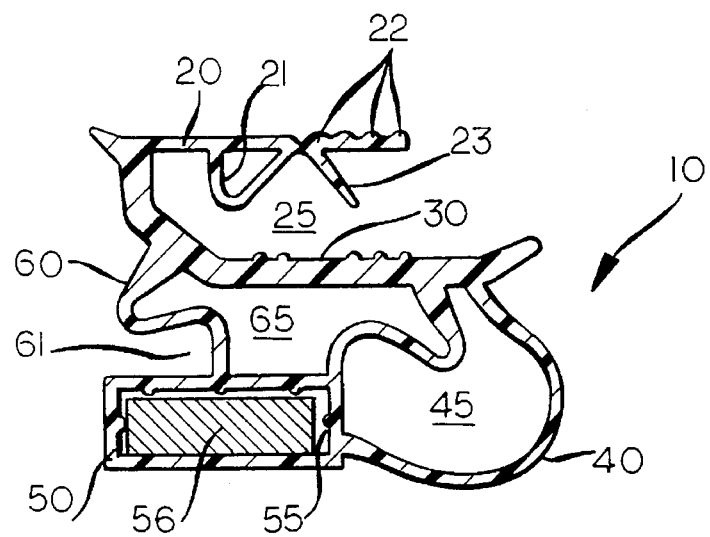
FIG. 2 is a cross-sectional view of the first gasket section shown in FIG. 1.
Figure 3:
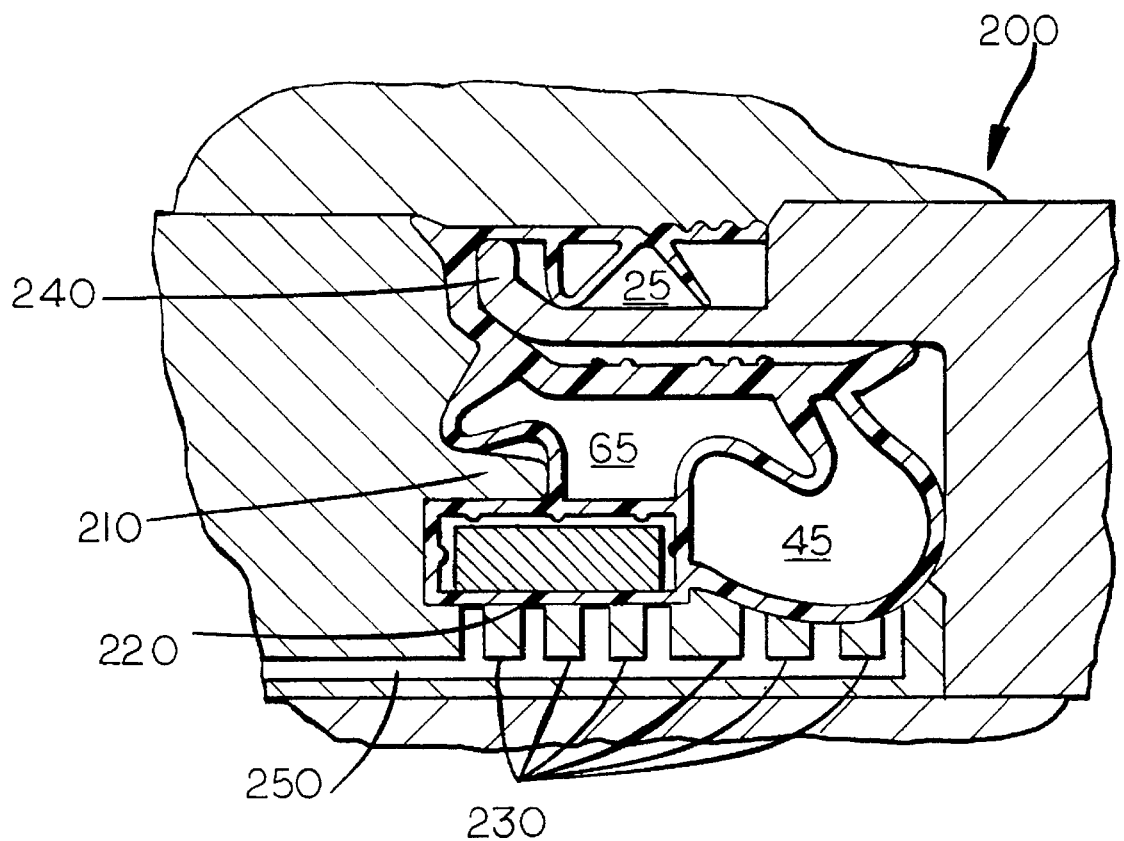
FIG. 3 is the same cross-sectional view as in FIG. 2, with the first gasket section engaged with the right half of the splice mold tooling.

The preferred embodiment of the present invention, as shown in FIGS. 1–3, employs a two-piece splice mold (not shown), which may be of conventional construction, except for modifications described herein. Right half 200 of the splice mold contains apertures 230 on right support plate 220 near the right trim edge (not shown), which is defined as the location where right support plate 220 of the splice mold tooling terminates so that the mold can be closed and the gasket sections 10 and 10' can be spliced. Apertures 230 are connected to a vacuum pump (not shown) via air passage 250. Right half 200 of the splice mold tooling includes upper retention ridge 240 and lower retention ridge 210 for engaging gasket section 10 during the splicing procedure, as described below (second gasket section 10' and component parts thereof corresponding to first gasket section 10 use reference characters denoted by the "'" symbol; for example, channel 45' of second gasket section 10' is the counterpart of channel 45 of first gasket section 10, etc.). Similarly, left half 200' (not shown) of the splice mold is an exact mirror image of right half 200 and component parts thereof are also identified by a corresponding numeral along with the "'" symbol. Left half 200' engages second gasket section 10' in exactly the same manner in which right half 200 engages first gasket section 10.

Magnetic strip 56 is inserted into channel 55 of first gasket section 10 and magnetic strip 56' (not shown) is inserted into channel 56' (not shown) of second gasket section 10'. First gasket section 10, preferably extruded from a PVC compound or the like, is inserted into right half 200 of the splice mold until joinable end 15 of gasket member 10 extends 1–2 mm beyond the trim edge of right half 200 of the splice mold. Upper retention ridge 240 engages channel 25 and lower retention ridge engages groove 61. Magnetic strip 56 is then adjusted in channel 55, if necessary, such that the end of magnetic strip 56 does not extend beyond the trim edge. An identical adjustment operation is performed, preferably simultaneously, with counterpart joinable end 15' of second gasket section 10'. Second gasket section 10' is fed onto left half 200' of the splice mold with upper retention ridge 240' engaging channel 25' and lower retention ridge 210' engaging groove 61' in an identical manner as that in right half 200 of the splice mold. When both gasket sections 10 and 10' and magnetic strips 56 and 56' are correctly positioned, the vacuum pump is activated which draws air through apertures 230 via air passage 250 in right splice mold half 200. Thin walls 40, 50 of gasket member 10 are drawn tightly against the contour of support plate 220 of right half 200 of the splice mold, and thin walls 40', 50' are drawn tightly against the contour of support plate 220' of left half 200' of the splice mold. As discussed previously, the retention action of the air being drawn through apertures 230 and 230' provides the additional stability for flexible gasket sections 10, 10' necessary to complete a successful splice. A heat source of conventional construction (not shown) simultaneously heats joinable ends 15, 15' of both gasket sections 10, 10' for a time sufficient to heat the PVC compound to a softened state and then is withdrawn. The right and left halves 200, 200' of the splice mold are closed together, forcing heated joinable ends 15, 15' of gasket sections 10, 10' to come into contact with each other (although the PVC compound is not fully heated to its melting point, the softened condition of the compound plus pressure supplied by closing the splice mold allows a strong permanent bonding of the two gasket sections 10, 10'). Heated joinable ends 15, 15' are allowed to cool which forms a permanently spliced soft corner.

If both gasket sections 10, 10' have identical cross sections, the splice is formed such that each individual wall of first gasket section 10 is heat-welded to its counterpart wall of second gasket section 10'. For example, wall 20 is joined with 20', wall 30 with wall 30' etc. In addition, each channel of gasket section 10 is in fluid communication with its counterpart channel of gasket section 10'. For example, channel 25 is in fluid communication with channel 25', channel 45 with channel 45', etc. This non-destructive splicing procedure creates continuous channels along the entire inner portion of the spliced gasket and highly flexible (soft) corners, both of which provide the increased insulating properties of the finished gasket. Of course, the disclosed method may also be used with gasket sections which do not have identical cross sections, if so desired.

Although the best mode contemplated by the inventors for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A method of splicing a hollow gasket, comprising the steps of:

inserting a joinable end (15) of a first gasket section (10) into one half (200) of a splice mold, said one half (200) of said splice mold having a plurality of apertures (230), said apertures (230) being adjacent to said joinable end (15) of said first gasket section (10);

inserting a joinable end (15') of a second gasket section (10') into another half (200') of said splice mold, said other half (200') of said splice mold having a plurality of apertures (230'), said apertures (230') being adjacent to said joinable end (15') of said second gasket section (10'), said first and second gasket sections (10, 10') being spaced apart in said one and said other splice mold halves (200, 200'), respectively;

applying a vacuum to said apertures (230, 230') of said one half (200) and said other half (200') of said splice mold, said vacuum causing air to flow through said apertures (230, 230') whereby creating a force that draws said first and said second gasket sections (10, 10') against said one half (200) and said other half (200') of said splice mold, respectively;

applying heat to each of said joinable ends (15, 15') of said first and said second gasket sections (10, 10') until said joinable ends (15, 15') reach a softened condition;

removing said heat from said joinable ends (15, 15') of said first and said second gasket sections (10, 10');

closing said one half (200) and said other half (200') of said splice mold together such that the heated joinable end (15) of said first gasket section (10) and the heated joinable end (15') of said second gasket section (10') are brought into contact with each other;

cooling said heated joinable ends (15, 15'), whereby forming a permanent splice; and, removing said spliced gasket sections (10, 10') from said splice mold.

2. The method according to claim 1 wherein said first gasket section (10) is in fluid communication with said second gasket section (10') subsequent to the formation of said permanent splice.

3. The method according to claim 2 wherein said first gasket section (10) and said second gasket section (10') further comprise at least one inner wall, said at least one inner wall forming at least two distinct channels running longitudinally therethrough.

4. The method according to claim 3 wherein subsequent to the formation of said permanent splice, each of said at least two distinct channels of said first gasket section (10) are in fluid communication individually with each of said at least two distinct channels of said second gasket section (10'), whereby forming continuous channels within said gasket.

5. The method according to claim 4 further comprising the steps of:

inserting a first magnetic strip (56) inside said first gasket section (10); and, inserting a second magnetic strip (56') inside said second gasket section (10').

6. The method according to claim 5 wherein said hollow gasket comprises a PVC compound.

7. The method according to claim 6 wherein said first gasket section (10) and said second gasket section (10') have identical cross sections.

8. A method of splicing a hollow gasket, comprising:

providing splice mold means, said splice mold means having a plurality of apertures, said plurality of apertures being said splice mold means capable of receiving a first joinable end of a first gasket section and a second joinable end of a second gasket section;

providing vacuum means, said vacuum means being in fluid communication with said apertures of said splice mold means, said vacuum means for retaining said first joinable end of said first gasket section and said second joinable end of said second gasket section in a position appropriate to be joined together.

providing heating means, said heating means for heating said joinable ends of said first and said second gasket sections to a softened state;

providing transport means, said transport means for bringing the heated joinable ends of said first and said second gasket sections together; and, providing cooling means, said cooling means for reducing the temperature of said heated joinable ends, whereby forming a permanent splice.

9. The method according to claim 8 wherein said first gasket section is in fluid communication with said second gasket section subsequent to the formation of said permanent splice.

10. The method according to claim 9 wherein said first gasket section and said second gasket section further comprise at least one inner wall, said at least one inner wall forming at least two distinct channels running longitudinally therethrough.

11. The method according to claim 10 wherein subsequent to the formation of said permanently spliced corner, each of said at least two distinct channels of said first gasket section are in fluid communication individually with each of said at least two distinct channels of said second gasket section, whereby forming continuous channels within said gasket.

12. The method according to claim 11 further comprising the step of providing magnetic latch means, said magnetic latch means comprising a magnetic strip positioned inside one of said at least two continuous channels of each of said first and second gasket sections.

13. The method according to claim 12 wherein said hollow gasket comprises a PVC compound.

14. The method according to claim 13 wherein said first gasket section and said second gasket section have identical cross sections.

15. A method of splicing a flexible, thin-wall, multiple channel gasket, comprising the steps of:

inserting a joinable end of a first gasket section into one half of a splice mold, said first gasket section having at least one inner wall forming at least two distinct channels, said one half of said splice mold having a plurality of apertures, said plurality of apertures being located adjacent to said joinable end of said first gasket section;

inserting a joinable end of a second gasket section into an other half of said splice mold, said second gasket section having at least one inner wall forming at least two distinct channels, said second gasket section having a cross section identical to that of said first gasket section, said other half of said splice mold having a plurality of apertures, said apertures being located adjacent to said joinable end of said second gasket section;

applying a vacuum to said apertures of said one half and said other half of said splice mold, said vacuum causing air to be drawn through said apertures, thus creating a force that draws said first and said second gasket sections to said one half and said other half of said splice mold, respectively;

applying heat to each of said joinable ends of said first and said second gasket sections until said joinable ends reach a softened condition;

removing said heat from said joinable ends of said first and said second gasket sections;

closing said one half and said other half of said splice mold together such that the heated joinable end of said first gasket section and the heated joinable end of said second gasket section are brought into contact with each other;

cooling said heated joinable ends, whereby forming a permanent splice, each of said at least two distinct channels of said first gasket section being in fluid communication with each of said at least two distinct channels of said second gasket section subsequent to the formation of said permanent splice; and, removing said spliced gasket sections from said splice mold.

16. The method according to claim 15 further comprising the steps of:

inserting a first magnetic strip inside said first gasket section; and, inserting a second magnetic strip inside said second gasket section.

17. The method according to claim 16 wherein said flexible, thin-wall, multiple channel gasket comprises a PVC compound.

* * * * *